United States Patent
Oh et al.

(10) Patent No.: US 7,142,724 B2
(45) Date of Patent: Nov. 28, 2006

(54) APPARATUS AND METHOD TO ENHANCE A CONTRAST USING HISTOGRAM MATCHING

(75) Inventors: Jae-hwan Oh, Suwon (KR); Seung-joon Yang, Suwon (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 722 days.

(21) Appl. No.: 10/359,304

(22) Filed: Feb. 6, 2003

(65) Prior Publication Data
US 2003/0174887 A1 Sep. 18, 2003

(30) Foreign Application Priority Data
Feb. 6, 2002 (KR) ................... 2002-6832

(51) Int. Cl.
*G06K 9/40* (2006.01)
(52) U.S. Cl. ..................................... 382/274
(58) Field of Classification Search ............. 382/274, 382/286, 288
See application file for complete search history.

(56) References Cited

U.S. PATENT DOCUMENTS 6,594,388 B1 * 7/2003 Gindele et al. ............ 382/167

2004/0136570 A1 * 7/2004 Ullman et al. ............ 382/114

FOREIGN PATENT DOCUMENTS

| JP | 05-244508 | 9/1993 |
|---|---|---|
| JP | 08-195903 | 7/1996 |
| JP | 2000-506284 | 5/2000 |

OTHER PUBLICATIONS

Japanese Office Action in Patent Application No. 2003-027655, filed Feb. 4, 2003.

* cited by examiner

*Primary Examiner*—Phuoc Tran
(74) *Attorney, Agent, or Firm*—Staas & Halsey LLP

(57) ABSTRACT

An apparatus and method to enhance a contrast includes a first operation part, a second operation part, and a mapping part. The first operation part calculates an average and a standard deviation of an input image. The second operation part calculates an average and a standard deviation of a target image based on the average and the standard deviation of the input image. The mapping part converts a pixel value of the input image by a mapping function generated by receiving the averages and the standard deviations of the input image and the target image from the first operation part and the second operation part, respectively, and outputs a pixel value of an output image.

16 Claims, 4 Drawing Sheets

APPARATUS AND METHOD TO ENHANCE A CONTRAST USING HISTOGRAM MATCHING

CROSS-REFERENCE TO RELATED APPLICATIONS

This application claims the priority of Korean Patent Application No. 2002-6832, filed Feb. 6, 2002 in the Korean Intellectual Property Office, the disclosure of which is incorporated herein by reference.

BACKGROUND OF THE INVENTION

1. Field of the Invention

The present invention relates to an apparatus and method to enhance a contrast using a histogram matching, and more particularly, to an apparatus and method to enhance a contrast of an output image using a mapping table written based on a distribution of an input image and a target image.

2. Description of the Related Art

A histogram is to express a distribution of contrast values of pixels of an image. In other words, the histogram expresses a distribution range and values of light points and dark points existing in the image. A smoothness of the histogram makes uniform the distribution of the contrast values with a biased image or a non-uniform image, to thereby enhance the image. Through the smoothness of the histogram, a dark image becomes light, and a too light image becomes dark slightly, thereby maintaining a proper lightness. In other words, by correcting the distribution of the lightness values after the conversion, a contrast balance of the image is improved.

Figure 1A:
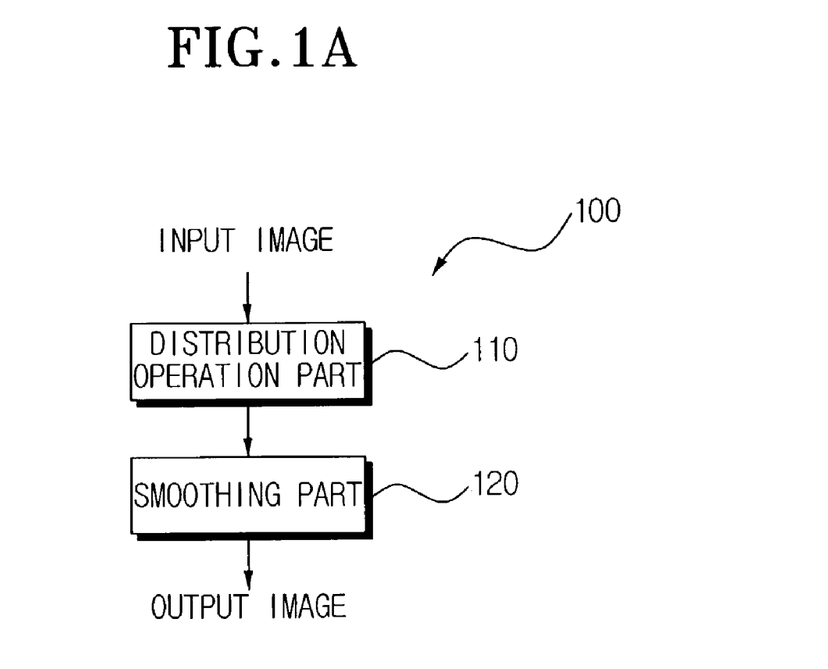
FIG. 1A is a block diagram of a conventional histogram smoothing apparatus.

FIG. 1A is a block diagram of a conventional histogram smoothing apparatus 100. Referring to FIG. 1A, the conventional histogram smoothing apparatus 100 includes a distribution operation part 110 and a smoothing part 120.

The distribution operation part 110 counts a lightness level from an input image to thereby obtain a histogram value or a probability density function, and calculates a cumulative distribution function from the obtained histogram value and the probability density function. The smoothing part 120 makes uniform the histogram of a given image using the cumulative distribution function calculated by the distribution operation part 110. As a consequence, the cumulative distribution function is non-linearly mapped with the given image, so that the contrast of the image is enhanced.

Figure 1B:
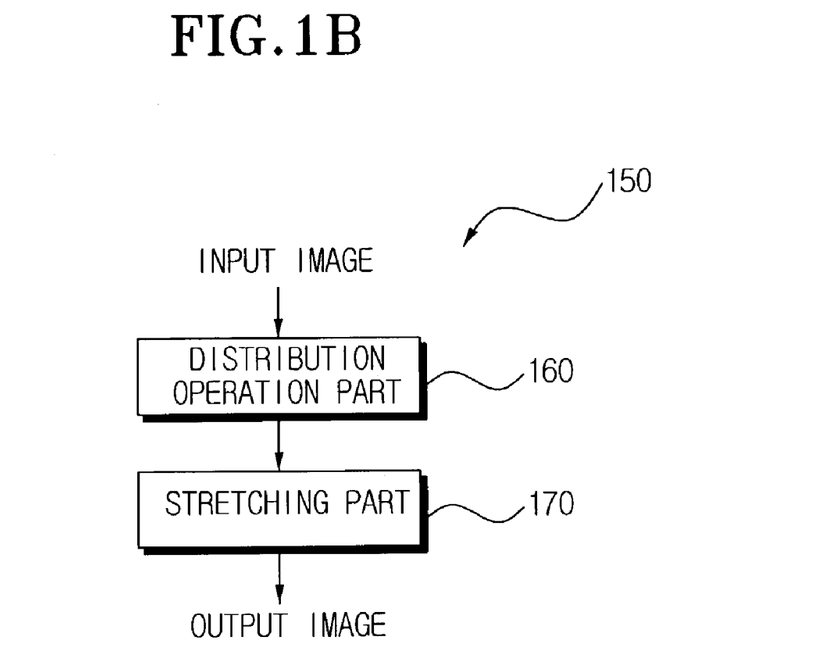
FIG. 1B is a block diagram of a conventional contrast stretching apparatus.

FIG. 1B is a block diagram of a conventional contrast stretching apparatus 150. Referring to FIG. 1B, the conventional contrast stretching apparatus 150 includes a distribution operation part 160 and a stretching part 170.

The distribution operation part 160 counts a lightness level from the image to thereby obtain the histogram value or the probability density function. The stretching part 170 obtains a pixel value having a lowest value and a highest value using the probability density function obtained by the distribution operation part 160, and displays the histogram using the obtained pixel values so as to utilize the distribution of the contrast values of the image to a maximum extent.

By performing a subtraction operation using the pixel value having the lowest value in the image, the histogram is moved toward a left of the image. At this time, the respective pixel values of the image are extended so as to include the entire contrast values. Accordingly, the image comes to have the contrast values from 0 to 255, so that the contrast of the image increases.

However, the conventional histogram smoothing has drawbacks such as being difficult to control a degree of the contrast enhancement. The conventional histogram utilizes the probability density function and the cumulative distribution function obtained from the given image as a mapping to enhance the contrast. Thus, in case that the given image has a special property or is damaged due to noises, it is not easy to obtain a desired result.

Also, the conventional histogram smoothing fails to maintain a relative brightness. The brightness of the image obtained through the histogram smoothing has no relation with the brightness of the given image. So, in case that the conventional histogram smoothing is applied to a video sequence, a discrimination of a light scene and a dark scene disappears. The conventional histogram smoothing can be effectively performed when it is applied to the image having fineness in a dark portion of the image. On the contrary, the image having a good quality becomes bad. In order to overcome the aforementioned drawbacks, complicated algorithms have been provided making it difficult to realize such a device.

Meanwhile, in case of the conventional contrast stretching technology, if there exists a light portion or a dark portion in the image, a margin of the stretching is not secured, making it difficult to anticipate a good result.

SUMMARY OF THE INVENTION

Various aspects and advantages of the invention will be set forth in part in the description that follows and, in part, will be obvious from the description, or may be learned by practice of the invention.

Accordingly, it is an aspect of the invention to provide an apparatus and method to enhance a contrast, in which an enhancement degree of the contrast can be controlled and a relative brightness can be maintained upon controlling the contrast.

To accomplish the above aspect and other advantages, there is provided an apparatus to enhance a contrast. The apparatus includes: a first operation part calculating an average and a standard deviation of an input image; a second operation part calculating an average and a standard deviation of a target image based on the average and the standard deviation of the input image; and a mapping part converting a pixel value of the input image by a mapping function generated by receiving the averages and the standard deviations of the input image and the target image from the first operation part and the second operation part, respectively, and outputting a pixel value of an output image.

In accordance with an aspect of the present invention, the apparatus further includes a mapping range designation part providing the mapping part with a lowest upper bound and a highest lower bound with respect to the pixel value of the input image. The mapping part converts the pixel value of the input image, which exists between the lowest upper bound and the highest lower bound, by the mapping function.

Selectively, the mapping part converts the pixel value of the input image using the mapping function selected from a plurality of mapping functions for respective lower regions formed, by dividing a mapping region between the lowest upper bound and the highest lower bound based on an average of the input image.

In accordance with an aspect of the present invention, the mapping part selects the mapping function used in converting the pixel value of the input image from the plurality of mapping functions using a following equation:

$$F(x) = \begin{cases} \max(\text{line1}, \text{line2}), & \text{if } x \le p_a \\ \min(\text{line2}, \text{line3}), & \text{if } x > p_a \end{cases}$$

where, line $1 = a(x - \text{threshold\_low}) + \text{threshold\_low}$ $$\text{line } 2 = \left(\frac{\sigma_b}{\sigma_a}(x - p_a) + p_b\right), \text{ and}$$

line $3 = b(x - \text{threshold\_high}) + \text{threshold\_high}$.

Also, the mapping function is expressed by a following equation:

$$y = \left(\frac{\sigma_b}{\sigma_a}\right)(x - p_a) + p_b,$$

where, x is the pixel value of the input image, y is the pixel value of the output image, $\sigma_a$ is the standard deviation of the input image, $\sigma_b$ is the standard deviation of the target image, $p_a$ is the average of the input image, and $p_b$ is the average of the target image.

In accordance with an aspect of the present invention, the second operation part calculates the standard deviation of the target image using a following equation:

$$\sigma_b = m(1-k) + k\sigma_a$$

$$k = g(p_a - 128)$$

where, x is the pixel value of the input image, y is the pixel value of the output image, $\sigma_a$ is the standard deviation of the input image, $\sigma_b$ is the standard deviation of the target image, $p_a$ is the average of the input image, and $p_b$ is the average of the target image, According to another aspect of the present invention, there is provided a method to enhance a contrast. The method includes: calculating an average and a standard deviation of an input image; calculating an average and a standard deviation of a target image based on the average and the standard deviation of the input image; generating a mapping function based on the average and the standard deviation of the input image and the average and the standard deviation of the target image; and converting a pixel value of the input image using the generated mapping function and outputting a pixel value of an output image.

In an aspect of the present invention, the method, prior to the conversion of the pixel value, further includes designating a lowest upper bound and a highest lower bound with respect to the pixel value of the input image. The generation of the mapping function converts the pixel value of the input image exists between the lowest upper bound and the highest lower bound.

In an aspect according to the present invention, the conversion of the pixel value of the input image using the mapping function selected from a plurality of mapping functions for respective lower regions is formed by dividing a mapping region between the lowest upper bound and the highest lower bound based on the average of the input image.

Here, the conversion of the pixel value selects the mapping function used in converting the pixel value of the input image from the plurality of mapping functions using a following equation:

$$F(x) = \begin{cases} \max(\text{line1}, \text{line2}), & \text{if } x \le p_a \\ \min(\text{line2}, \text{line3}), & \text{if } x > p_a \end{cases}$$

where, line $1 = a(x - \text{threshold\_low}) + \text{threshold\_low}$ $$\text{line } 2 = \left(\frac{\sigma_b}{\sigma_a}(x - p_a) + p_b\right), \text{ and}$$

line $3 = b(x - \text{threshold\_high}) + \text{threshold\_high}$.

Also, the mapping function is expressed by a following equation:

$$y = \left(\frac{\sigma_b}{\sigma_a}\right)(x - p_a) + p_b$$

where, x is the pixel value of the input image, y is the pixel value of the output image, $\sigma_a$ is the standard deviation of the input image, $\sigma_b$ is the standard deviation of the target image, $p_a$ is the average of the input image, and $p_b$ is the average of the target image.

In an aspect according to the present invention, the calculation of the average and the standard deviation of the target image calculates the standard deviation of the target image using a following equation:

$$\sigma_b = m(1-k) + k\sigma_a$$

$$k = g(P_a - 128)$$

where, $\sigma_a$ is the standard deviation of the input image, $p_a$ is the average of the input image, m is a predetermined variable of a standard deviation, k is a parameter between 0 and 1, and g( ) is a function to determine the parameter k, wherein the parameter k converges to 0 as the average of the input image approaches 128 that is an average of a Gaussian distribution, and the parameter k converges to 1 as the average of the input image is distant from the average of the Gaussian distribution.

According to an aspect of the present invention, a contrast enhancement apparatus can be easily realized. Also, by correcting parameters of the target image, an enhancement degree in a contrast of an entire image can be controlled, and by using multiple mapping functions, there can be prevented a phenomenon in which a dark portion and a light portion are overemphasized.

These together with other aspects and advantages which will be subsequently apparent, reside in the details of construction and operation as more fully hereinafter described and claimed, reference being had to the accompanying drawings forming a part thereof, wherein like numerals refer to like parts throughout.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENT

Reference will now be made in detail to the embodiments of the present invention, examples of which are illustrated in the accompanying drawings, wherein like reference numerals refer to like elements throughout. The embodiments are described below in order to explain the present invention by referring to the figures.

Figure 2:
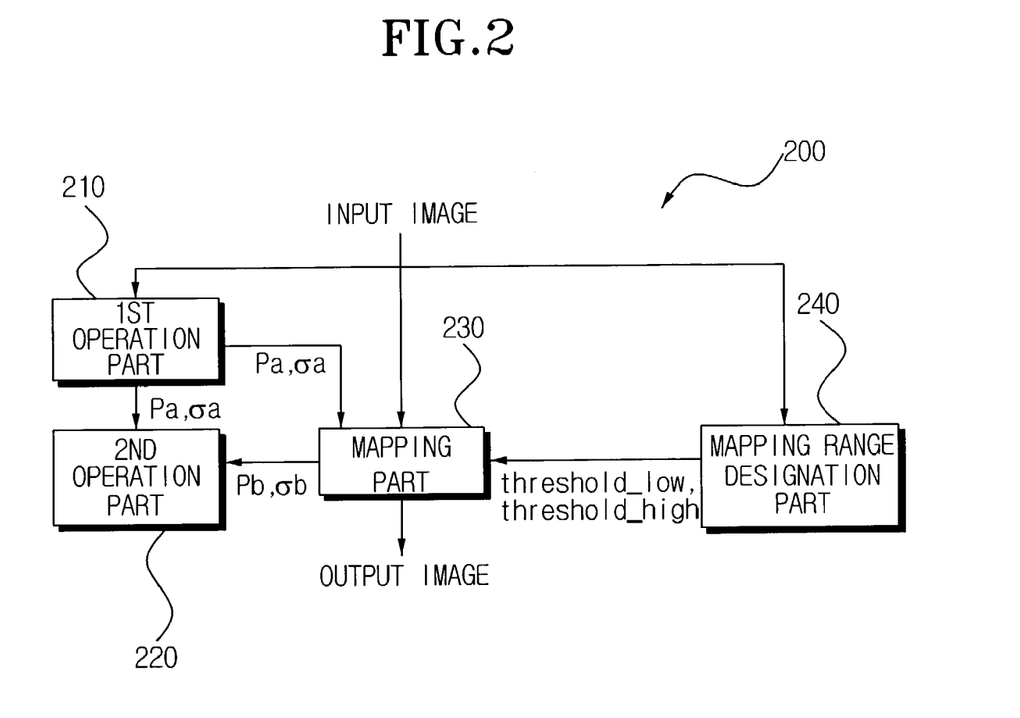
FIG. 2 is a block diagram of a contrast enhancement apparatus, in accordance with an aspect of the present invention.

FIG. 2 is a block diagram of a contrast enhancement apparatus 200, in accordance with an aspect of the present invention.

Referring to FIG. 2, the contrast enhancement apparatus 200 includes a first operation part 210, a second operation part 220, a mapping part 230, and a mapping range designation part 240.

The first operation part 210 calculates an average and a standard deviation of an input image. The second operation part 220 calculates an average and a standard deviation of a target image based on the average and the standard deviation of the input image. The second operation part 220 calculates the standard deviation of the target image using the following Equation 1:

$$\sigma_b = m(1-k) + k\sigma_a,$$

$$k = g(p_a - 128) \qquad \text{Equation 1,}$$

where, $\sigma_a$ is the standard deviation of the input image and $p_a$ is the average of the input image. Further, m is a variable of a standard deviation, and a change of m enables control of a contrast level. According to an aspect of the present invention, when a value of m is 56, the best image is output. The value of m may be changed from an outside source depending on a user's selection.

When the standard deviation of a histogram obtained from the input image is small, that indicates that a distribution of pixels leans toward one region and that a contrast of the image is not high as a whole. Hence, elevating the standard deviation of the target image using a histogram matching provides an effect in which the distribution of the pixels is made uniform.

Figure 3:
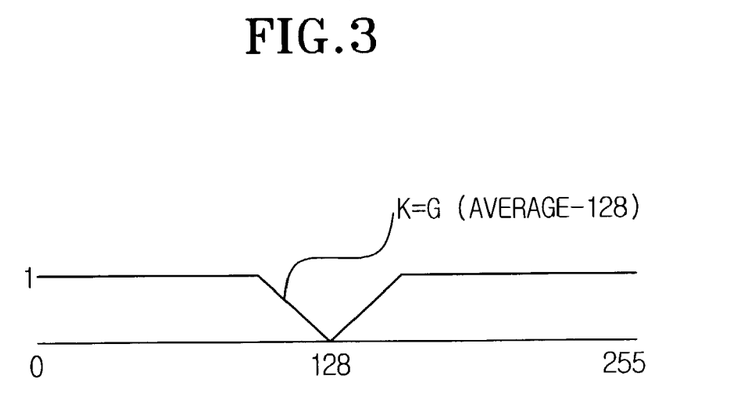
FIG. 3 is a schematic view showing one example of a function, g( ) to determine a parameter to approach a proper standard deviation depending on an average of an input image.

Further, according to Equation 1, the standard deviation of the target image is varied with the value of k, which is calculated by the function of g( ). The parameter k converges to zero (0) as the average of the input image approaches 128, which is an average of a Gaussian distribution, and the parameter k converges to 1 as the average of the input image is distant from the average of the Gaussian distribution. In a case that the parameter k is 0, the variable standard deviation becomes the standard deviation of the target image, and in case that the parameter k is 1, the standard deviation of the input image becomes the standard deviation of the target image. In FIG. 3, there is shown one example of the function g( ), which is used to express variations of k.

The mapping part 230 converts a pixel value of the input image by a mapping function generated by receiving the averages and the standard deviations of the input image and the target image from the first operation part 210 and the second operation part 220, and outputs the pixel value of an output image.

The mapping part 230 converts the input image into the output image using the mapping function expressed by the following Equation 2:

$$y = \left(\frac{\sigma_b}{\sigma_a}\right)(x - p_a) + p_b, \qquad \text{Equation 2}$$

where, x is the pixel value of the input image, y is the pixel value of the output image, $\sigma_a$ is the standard deviation of the input image, $\sigma_b$ is the standard deviation of the target image, $p_a$ is the average of the input image, and $p_b$ is the average of the target image.

According to Equation 2, when the input image has a Gaussian distribution of $(P_a, \sigma_a)$, the output image comes to have a Gaussian distribution of $(P_b, \sigma_b)$.

Also, according to Equations 1 and 2, the average of the target image uses the average of the input image without a change. In order to increase the brightness of the target image, the average of the target image needs to be increased, and in order to increase the contrast level, the standard deviation of the target image needs to be increased.

The mapping range designation part 240 provides the mapping part with a lowest upper bound and a the highest lower bound with respect to the pixel value of the input image to which the mapping function is applied. Depending on a device as used, there may exist a case in which the pixel values of a very dark portion and a very light portion are not changed. In this case, the mapping range designation part 240 designates critical values as a threshold low and a threshold high, and provides the mapping part 230 with the designated critical values. The mapping part 230 does not apply the mapping with a value in excess of the provided critical value.

Figure 4:
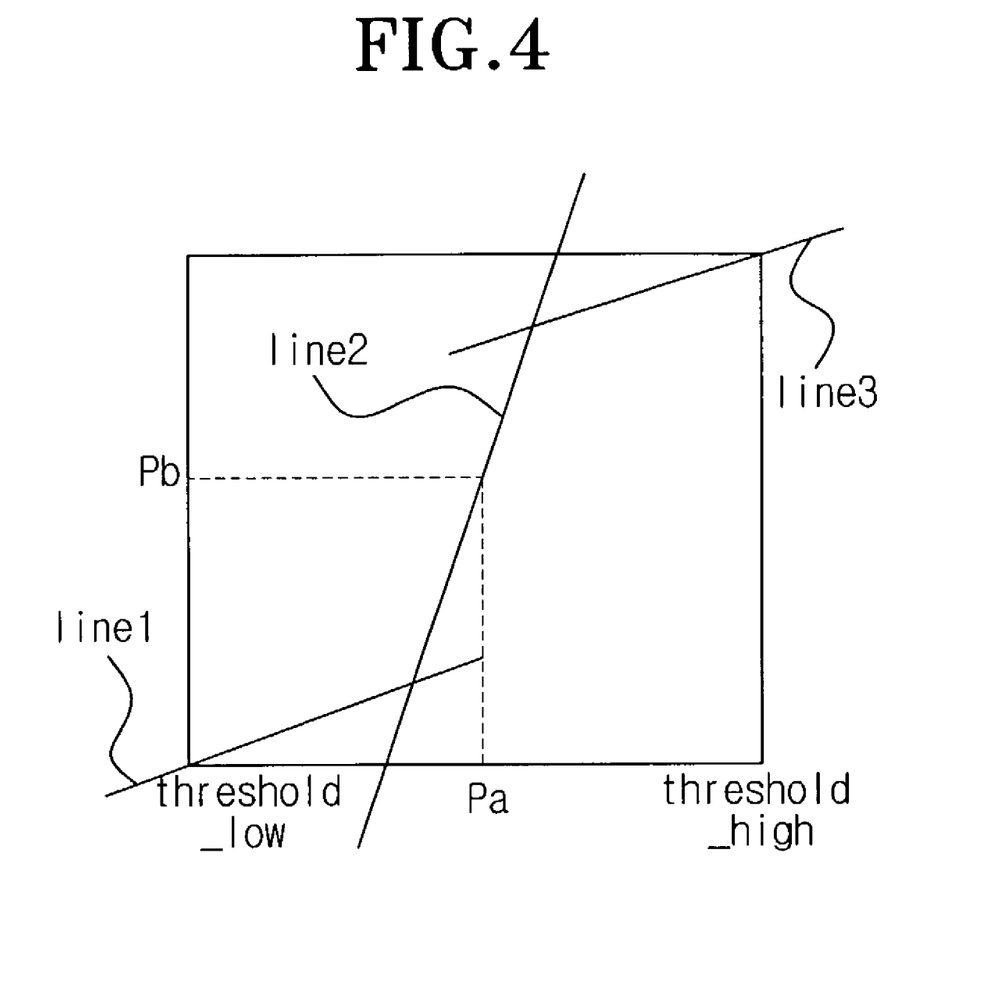
FIG. 4 is a graph illustrating a method using a mapping function by selecting one line among multiple lines representing the mapping function to prevent a number of pixel values from being mapped to one value.

Furthermore, for the mapping used in the mapping part 230, a case may occur in which many pixel values are mapped to a single value, which is prevented by an example to be described in FIG. 4. In other words, a relationship in which three lines representing the mapping function and one line by a relational expression used in respective regions are selected, the selected lines are used in the mapping function. In FIG. 4, an example is illustrated in which the relationship is embodied.

Referring to FIG. 4, when the pixel value "x" is greater than the average $P_a$ of the input image, the smallest of line 2 or line 3 is selected. Also, when the pixel value "x" is equal to or less than the average $P_a$ of the input image, the largest of line 1 or line 2 is selected. The selections are expressed by the following Equation 3:

$$F(x) = \begin{cases} \max(\text{line1}, \text{line2}), & \text{if } x \le p_a \\ \min(\text{line2}, \text{line3}), & \text{if } x > p_a \end{cases}$$

where, line 1 = $a(x-\text{threshold\_low}) + \text{threshold\_low}$ $$\text{line } 2 = \left(\frac{\sigma_b}{\sigma_a}(x - p_a) + p_b\right), \text{ and}$$

line 3=$b(x-\text{threshold\_high})+\text{threshold\_high}$.

The mapping part 230 applies the mapping function obtained by the example illustrated in FIG. 4 to the pixel value of the input image, thereby enhancing the contrast of the image.

Figure 5:
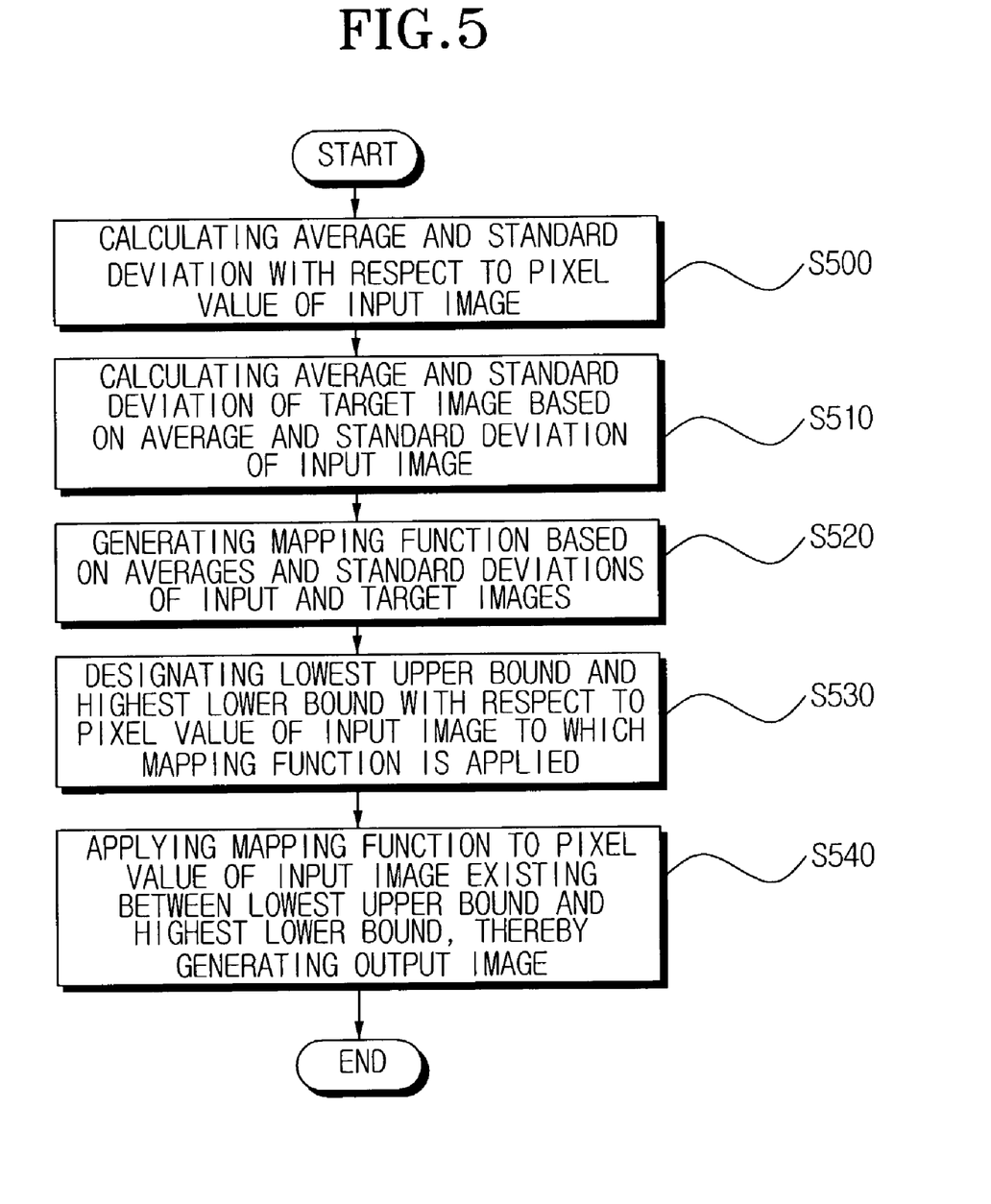
FIG. 5 is a flow chart illustrating a contrast enhancement method, in accordance with another aspect of the present invention.

FIG. 5 is a flow chart illustrating a contrast enhancement method, in accordance with an aspect of the present invention.

Referring to FIG. 5, at operation S500, the first operation part 210 calculates the average and the standard deviation for the pixel values of the input image. At operation S510, the second operation part 220 calculates the average and the standard deviation of the target image based on the average and the standard deviation of the input image. At operation S510, the average of the target image uses the average of the input image.

At operation S520, the mapping part 230 generates the mapping function based on the average and the standard deviation of the input image inputted from the first operation part 210 and the average and the standard deviation of the target image inputted from the second operation part 220. Furthermore, at operation S530, the mapping range designation part 240 designates the lowest upper bound and the highest lower bound with respect to the pixel value of the input image to which the mapping function is applied, and provides the mapping part 230 with the lowest upper bound and the highest lower bound. At operation S540, the mapping part 230 applies the mapping function to the pixel existing between the lowest upper bound and the highest lower bound provided from the mapping range designation part 240 among the pixels of the input image, thereby generating the output image.

As described previously, the present invention provides for an easy embodiment of a contrast enhancement apparatus. Also, by correcting parameters of a target image, an enhancement degree in a contrast of entire images can be controlled, and by using multiple mapping functions, a phenomenon in which a dark portion and a light portion of the image are overemphasized can be prevented.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. An apparatus enhancing a contrast, the apparatus comprising:
    a first operation part calculating an average and a standard deviation of an input image;
    a second operation part calculating an average and a standard deviation of a target image based o n the average and the standard deviation of the input image; and
    a mapping part converting a pixel value of the input image by a mapping function generated by receiving the averages and the standard deviations of the input image and the target image from the first operation part and the second operation part, respectively, and outputting a pixel value of an output image.

2. The apparatus as claimed in claim 1, further comprising:
    a mapping range designation part providing a mapping part with a lowest upper bound and a highest lower bound with respect to the pixel value of the input image,
    wherein the mapping part converts the pixel value of the input image, which exists between the lowest upper bound and the highest lower bound, using the mapping function.

3. The apparatus as claimed in claim 2, wherein the mapping part converts the pixel value of the input image using the mapping function selected from a plurality of mapping functions of respective lower regions formed by dividing a mapping region between the lowest upper bound and the highest lower bound based on the average of the input image.

4. The apparatus as claimed in claim 3, wherein the mapping part selects the mapping function used in converting the pixel value of the input image from the plurality of mapping functions using a following equation:

$$F(x) = \begin{cases} \max(\text{line1}, \text{line2}), \text{ if, } x \leq p_a \\ \min(\text{line2}, \text{line3}), \text{ if, } x > p_a \end{cases}$$

where, line 1=$a(x-\text{threshold\_low})+\text{threshold\_low}$ $$\text{line } 2 = \left(\frac{\sigma_b}{\sigma_a}(x - p_a) + p_b\right), \text{ and}$$

line 3=$b(x-\text{threshold\_high})+\text{threshold\_high}$.

5. The apparatus as claimed in claim 2, wherein the mapping function is expressed by a following equation:

$$y = \left(\frac{\sigma_b}{\sigma_a}\right)(x - p_a) + p_b$$

where, x is the pixel value of the input image, y is the pixel value of the output image, $\sigma_a$ is the standard deviation of the input image, $\sigma_b$ is the standard deviation of the target image, $p_a$ is the average of the input image, and $p_b$ is the average of the target image.

6. The apparatus as claimed in claim 2, wherein the second operation part calculates the standard deviation of the target image using a following equation:

$$\sigma_b = m(1-k) + k\sigma_a$$

$$k = g(p_a - 128)$$

where, $\sigma_a$ is the standard deviation of the input image, $p_a$ is the average of the input image, m is a predetermined variable of a standard deviation, k is a parameter between 0 and 1, and g( ) is a function to determine the parameter k, wherein the parameter k converges to 0 as the average of the input image approaches 128, which is an average of a Gausian distribution, and the parameter k converges to 1 as the average of the input image is distant from the average of the Gausian distribution.

7. The apparatus as claimed in claim 1, wherein the mapping function is expressed using a following equation:

$$y = \left(\frac{\sigma_b}{\sigma_a}\right)(x - p_a) + p_b$$

where, x is the pixel value of the input image, y is the pixel value of the output image, $\sigma_a$ is the standard deviation of the input image, $\sigma_b$ is the standard deviation of the target image, $p_a$ is the average of the input image, and $p_b$ is the average of the target image.

8. The apparatus as claimed in claim 1, wherein the second operation part calculates the standard deviation of the target image using a following equation:

$$\sigma_b = m(1-k) + k\sigma_a$$

$$k = g(p_a - 128)$$

where, $\sigma_a$ is the standard deviation of the input image, $p_a$ is the average of the input image, m is a predetermined variable of a standard deviation, k is a parameter between 0 and 1, and g( ) is a function to determine the parameter k, wherein the parameter k converges to 0 as the average of the input image approaches 128, which is an average of a Gaussian distribution, and the parameter k converges to 1 as the average of the input image is distant from the average of the Gaussian distribution.

9. A method to enhance a contrast, the method comprising:

calculating an average and a standard deviation of an input image;

calculating an average and a standard deviation of a target image based on the average and the standard deviation of the input image;

generating a mapping function based on the average and the standard deviation of the input image and the average and the standard deviation of the target image; and converting a pixel value of the input image using the generated mapping function and outputting a pixel value of an output image.

10. The method as claimed in claim 9, prior to converting the pixel value of the input image, the method further comprising:

designating a lowest upper bound and a highest lower bound with respect to the pixel value of the input image, wherein the generation of the mapping function converts the pixel value of the input image, which exists between the lowest upper bound and the highest lower bound, using the mapping function.

11. The method as claimed in claim 10, wherein the pixel value of the input image is converted by the mapping function selected from a plurality of mapping functions of respective lower regions formed by dividing a mapping region between the lowest upper bound and the highest lower bound based on the average of the input image.

12. The method as claimed in claim 11, wherein the mapping function used in converting the pixel value of the input image from the plurality of mapping functions is selected using a following equation:

$$F(x) = \begin{cases} \max(\text{line1}, \text{line2}), \text{if}, x \leq p_a \\ \min(\text{line2}, \text{line3}), \text{if}, x > p_a \end{cases}$$

where, line 1=a(x−threshold_low)+threshold_low $$\text{line } 2 = \left(\frac{\sigma_b}{\sigma_a}(x - p_a) + p_b\right), \text{ and}$$

line 3=b(x−threshold_high)+threshold_high.

13. The method as claimed in claim 10, wherein the mapping function is expressed by a following equation:

$$y = \left(\frac{\sigma_b}{\sigma_a}\right)(x - p_a) + p_b$$

where, x is the pixel value of the input image, y is the pixel value of the output image, $\sigma_a$ is the standard deviation of the input image, $\sigma_b$ is the standard deviation of the target image, $p_a$ is the average of the input image, and $p_b$ is the average of the target image.

14. The method as claimed in claim 10, wherein the standard deviation of the target image is calculated using a following equation:

$$\sigma_b = m(1-k) + k\sigma_a$$

$$k = g(p_a - 128)$$

where, $\sigma_a$ is the standard deviation of the input image, $p_a$ is the average of the input image, m is a predetermined variable of a standard deviation, k is a parameter between 0 and 1, and g( ) is a function to determine the parameter k, wherein the parameter k converges to 0 as the average of the input image approaches 128, which is an average of a Gaussian distribution, and the parameter k converges to 1 as the average of the input image is distant from the average of the Gaussian distribution.

15. The method as claimed in claim 9, wherein the mapping function is expressed using a following equation:

$$y = \left(\frac{\sigma_b}{\sigma_a}\right)(x - p_a) + p_b$$

where, x is the pixel value of the input image, y is the pixel value of the output image, $\sigma_a$ is the standard deviation of the input image, $\sigma_b$ is the standard deviation of the target image, $p_a$ is the average of the input image, and $p_b$ is the average of the target image.

16. The method as claimed in claim 9, wherein the standard deviation of the target image is calculated using a following equation:

$$\sigma_b = m(1-k) + k\sigma_a$$

$$k = g(p_a - 128)$$

where, $\sigma_a$ is the standard deviation of the input image, $p_a$ is the average of the input image, m is a predetermined variable of a standard deviation, k is a parameter between 0 and 1, and g( ) is a function to determine the parameter k, wherein the parameter k converges to 0 as the average of the input image approaches 128, which is an average of a Gausian distribution, and the parameter k converges to 1 as the average of the input image is distant from the average of the Gausian distribution.

* * * * *

UNITED STATES PATENT AND TRADEMARK OFFICE
CERTIFICATE OF CORRECTION

PATENT NO.       : 7,142,724 B2                                    Page 1 of 1
APPLICATION NO.  : 10/359304
DATED            : November 28, 2006
INVENTOR(S)      : Jae-hwan Oh et al.

It is certified that error appears in the above-identified patent and that said Letters Patent is hereby corrected as shown below:

Column 7, Line 62, change "o n" to --on--.

Column 9, Line 3, change "Gausian" to --Gaussian--.

Column 9, Line 5, change "Gausian" to --Gaussian--.

Column 12, Line 6, change "Gausian" to --Gaussian--.

Column 12, Line 8, change "Gausian" to --Gaussian--.

Signed and Sealed this

Twentieth Day of March, 2007

JON W. DUDAS
*Director of the United States Patent and Trademark Office*